Dec. 23, 1958

W. P. McKAIN 2,865,641

TOOL HOLDER FOR TOOL DRESSING MACHINES

Filed Jan. 23, 1956

INVENTOR
Walter P. McKain
By Hoopes, Leonard & Buell
his attorneys

United States Patent Office 2,865,641
Patented Dec. 23, 1958

2,865,641

TOOL HOLDER FOR TOOL DRESSING MACHINES

Walter P. McKain, Parkersburg, W. Va., assignor, by mesne assignments, to Fada Radio & Electric Co., Inc., Cincinnati, Ohio, a corporation of New York Application January 23, 1956, Serial No. 560,650

8 Claims. (Cl. 279—9)

This invention relates to a tool holder for tool dressing machines and particularly to such a tool holder which is of unprecedentedly simple and inexpensive construction while most effectively performing its function.

The tool holder of the present application may be used in tool dressing machines of various types. One machine in which the tool holder may be used is disclosed in copending application Serial No. 512,764, filed June 2, 1955. In that tool dressing machine one end of a tool, heated to forging temperature, is disposed within a die to be acted on by a dressing roller which dresses or sharpens the tool by forging or flowing the metal of which the tool is made, the opposite end of the tool being held by a tool holder movable generally lengthwise of the tool to aid in positioning the tool for dressing, to hold the tool in proper position while being dressed and to draw the dressed tool through a trimming die to trim off the flash. The tool holder shown in said copending application is effective and satisfactory in use but is undesirably complex in structure and operation and of undesirably high cost.

I provide a tool holder which from the practical standpoint is as effective as the tool holder of said copending application but of relatively simple and inexpensive construction. Indeed, the tool holder of the present application has an important practical advantage in that it is less likely to become out of order and to require servicing, having a minimum of moving parts.

I provide a tool holder for tool dressing machines comprising a support, a tool-engaging member carried by the support and movable relatively thereto, the tool-engaging member being shaped to receive a portion of a tool in interfitting relationship therewith when the tool-engaging member is in a predetermined position relatively to the support, and means fixedly carried by the support alongside the path of the tool-engaging member in its movement relatively to the support cooperating with the tool-engaging member and said portion of the tool to maintain the tool-engaging member and said portion of the tool in interfitting relationship after commencement of movement relatively to the support from said predetermined position of the tool-engaging member with said portion of the tool in interfitting relationship therewith.

The support carrying the tool-engaging member may be a movable carriage forming part of the dressing machine. For example, in said copending application the movable carriage, sometimes termed a tailstock, is movable in longitudinal guides by means of parallel screws. The carriage is roughly adjusted longitudinally of the dressing machine for tools of various lengths, the fine adjustments in positioning the heated end of the tool in the dressing die being accomplished by movement of the tool holder relatively to the carriage.

The support, whether a movable carriage or not, may carry a cylinder, and a piston may operate in the cylinder, the tool-engaging member being connected with the piston for movement therewith relatively to the cylinder and support. The tool-engaging member may have a laterally open recess for receiving a portion of a tool in interfitting relationship therewith when the tool-engaging member is in a predetermined position relatively to the support, and the means fixedly carried by the support alongside the path of the tool-engaging member may be opposed to said recess whereby to maintain the tool-engaging member and said portion of the tool in interfitting relationship.

The support may carry a generally tubular member and the tool-engaging member may be movable within the generally tubular member. The tool-engaging member may be adapted to receive a portion of a tool in interfitting relationship therewith when the tool-engaging member is in position outside the generally tubular member, the generally tubular member cooperating with the tool-engaging member and said portion of the tool to maintain the tool-engaging member and said portion of the tool in interfitting relationship when the tool-engaging member and said portion of the tool enter the generally tubular member. The generally tubular member may be of greater length at one lateral portion thereof than at the opposite lateral portion thereof and the tool-engaging member may have a laterally open recess for receiving a portion of a tool in interfitting relationship therewith, the recess being disposed opposite the second mentioned lateral portion of the generally tubular member, the tool-engaging member when said recess is exposed to the outside at the second mentioned lateral portion of the generally tubular member being adapted to receive a portion of a tool in said recess, the generally tubular member cooperating with the tool-engaging member and said portion of the tool to maintain the tool-engaging member and said portion of the tool in interfitting relationship when the tool-engaging member and said portion of the tool are moved into the generally tubular member. The generally tubular member may have at the second mentioned lateral portion thereof and projecting generally inwardly thereof means cooperating with the tool-engaging member and said portion of the tool to maintain the tool-engaging member and said portion of the tool in interfitting relationship when the tool-engaging member and said portion of the tool are moved into the generally tubular member.

Other details, objects and advantages of the invention will become apparent as the following description of a present preferred embodiment thereof proceeds.

In the accompanying drawings I have shown a present preferred embodiment of the invention in which Figure 1 is a vertical transverse cross-sectional view through a tool dressing machine adjacent the tool holder;

Figure 1:
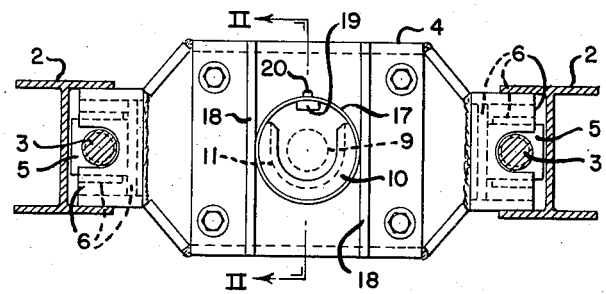

I have purposely avoided showing in the drawings any more of the tool dressing machine than need be shown to enable an understanding of the structure and operation of the tool holder which is the subject of the present application. The above mentioned copending application shows one form of tool dressing machine and a machine of the same general form is shown fragmentarily in the drawing of the present application.

The tool dressing machine has an elongated generally horizontally disposed frame comprising opposed frame members 2 shown in Figure 1. Mounted in suitable bearings in the frame and provided with suitable driving means are opposed parallel screws 3 adapted to be turned synchronously to move longitudinally of the machine a carriage or tailstock designated generally by reference numeral 4. The movement of the carriage 4 may, for example, be accomplished through the action of nuts 5 through which the screws 3 are threaded. Each of the nuts 5 may be held against rotation and against longitudinal movement relatively to the carriage 4 by means such as plates 6 so that when the screws are turned synchronously the nuts 5 are caused to travel along the screws and to carry with them the carriage or tailstock 4. The screws are of the same pitch and may be of the same hand and turn in the same direction or they may be of opposite hand and turn in opposite directions so as to cause both nuts 5 to move in the same direction longitudinally of the screws and at the same speed. The carriage 4 is shown as being built up of structural members welded together although it may be otherwise fabricated.

Mounted in the carriage 4 and disposed with its axis generally horizontal and longitudinally of the machine is a cylinder 7 in which operates a piston 8. The piston is operated by any suitable fluid under pressure as known to those skilled in the art. The fluid is admitted to and discharged from the cylinder 7 at the respective ends thereof through ports controlled by valves not shown as well known to those skilled in the art.

Figure 3:
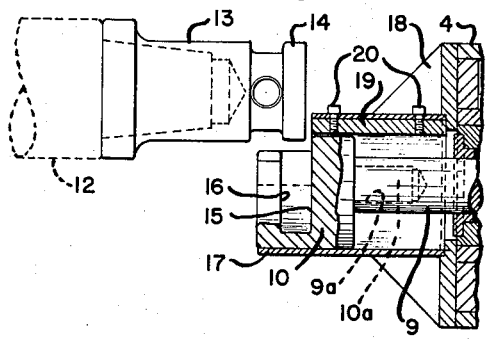
Figure 3 is a view similar to a portion of Figure 2 showing a tool adapter ready for insertion into the tool holder.
Figure 4:
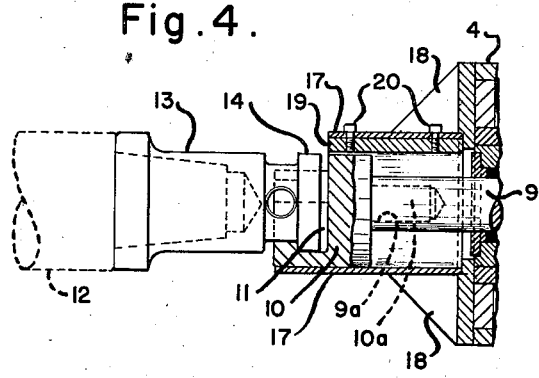
Figure 4 is a view similar to Figure 3 showing a tool adapter received within the laterally open recess of the tool holder.

Connected with the piston 8 is a piston rod 9 and carried by the piston rod 9 is the tool-engaging member 10. The tool-engaging member 10 may be connected with the piston rod 9 by screwing a threaded stud 10a of the tool-engaging member into a threaded socket 9a of the piston rod. The tool-engaging member 10 is shaped to receive a portion of a tool in interfitting relationship therewith when the tool-engaging member is in the position shown in Figures 3 and 4. In the form shown the tool-engaging member 10 has a laterally open recess 11 for receiving a portion of a tool. In the drawings there is shown in dotted lines a tool 12 having an adapter 13 applied thereto although either the tool itself or an adapter applied to the tool if appropriately shaped may be interfitted with the tool-engaging member 10. The adapter 13 shown in the drawings has a flange 14 which is adapted to be moved laterally into the recess 11 as illustrated by Figures 3 and 4. In Figure 3 the tool and adapter are about to be moved laterally to position the flange 14 in the recess 11 and in Figure 4 the movement has been completed. The flange 14 when in the recess 11 of the tool-engaging member 10 lies between opposed portions 15 and 16 of the tool-engaging member so that the tool cannot move longitudinally relatively to the tool-engaging member.

Figure 2:
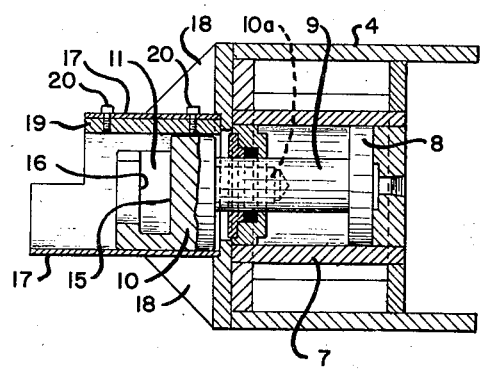
Figure 2 is a fragmentary vertical longitudinal cross-sectional view to enlarged scale taken on the line II—II of Figure 1.

It has been stated above that when the tool-engaging member 10 is in the position shown in Figures 3 and 4 it may receive a tool. That is because in that position the recess 11 is laterally open to the outside. I provide a very simple and inexpensive yet highly effective means for maintaining the tool and the tool-engaging member in interfitting relationship. I mount on the carriage 4 a generally tubular member designated generally by reference numeral 17. The generally tubular member 17 may be mounted coaxially with the cylinder 7 as shown in Figure 2, plates 18 which may be welded to the respective elements being shown as the means whereby the generally tubular member 17 is mounted in place. The generally tubular member 17 is shown as being of generally circular shape although its shape may be varied as may be desired. The generally tubular member is of greater length at one lateral portion thereof (the lower portion) than at the opposite lateral portion thereof (the upper portion) as shown in Figures 2, 3, 4 and 5. The length of the upper portion of the generally tubular member 17 is such that when the tool-engaging member 10 is moved to the left to the position shown in Figures 3 and 4 the recess 11 will be disposed above the upper portion of the member 17 and exposed to the outside to enable a portion of a tool to be interengaged therewith. In the form shown the tool-engaging member 10 is at least partially supported by the lower portion of the generally tubular member 17 throughout the movement of the member 10.

Figure 5:
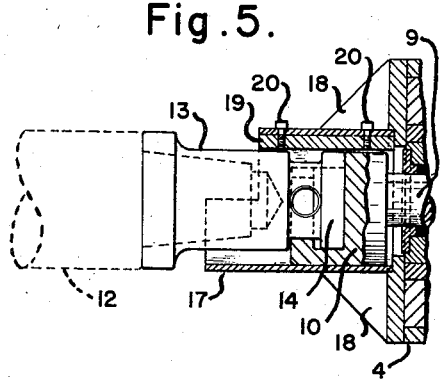
Figure 5 is a view similar to Figure 4 showing the tool holder moved into position in which the tool adapter and tool holder are maintained in interfitting relationship.

Disposed within the upper portion of the member 17 is a bar 19. The bar 19 is maintained in place by screws 20. The bar 19 is adapted to cooperate with the tool-engaging member and the tool to maintain them in interengagement when the tool-engaging member is moved to the right viewing Figures 4 and 5 from the position of Figure 4 to the position of Figure 5. Figure 5 shows the tool firmly locked to the tool-engaging member. The portions 15 and 16 prevent longitudinal movement of the tool and the bar 19 holds the tool in the recess or socket 11.

When a tool to be dressed is to be inserted into the tool dressing machine it is delivered to the machine by suitable means such as a crane, the end of the tool to be dressed having first been brought to forging temperature. The tool is lowered into the machine with the end to be dressed received by a dressing die. The opposite end of the tool is held by the tool holder. As the tool is introduced into the machine the parts of the tool holder are positioned as shown in Figure 3 and the carriage is moved longitudinally of the machine to its roughly adjusted position. After the tool has been placed in the machine with one end in the dressing die and the other end in the tool holder the tool-engaging member 10 is by operation of the piston 8 moved to properly adjust the tool in the die for dressing. In order to provide for movement of the member 10 in whatever direction may be desired the carriage may be moved a short distance one way or the other; but the fine adjustment of the tool for dressing is ordinarily accomplished by moving member 10 and not by moving the carriage.

After the end of the tool to be dressed has been properly positioned in the dressing die the carriage is moved to the left viewing Figures 2, 3, 4 and 5 while the tool-engaging member 10 and the piston 8 remain stationary until the piston 8 is against the right-hand end of the cylinder 7 as shown in Figure 2, this being done so that when the dressing roller acts on the end of the tool being dressed the force exerted by that roller tending to move the tool toward the right viewing Figure 2 will be resisted not simply by the fluid in the cylinder 7 but by the entire carriage or tailstock.

During the dressing of the tool the tool may be periodicaly advanced short distances toward the left viewing Figure 2 by moving the piston 8 in the cylinder 7 and after the tool has been properly positioned following up by again moving the carriage or tailstock to the left to back up the piston 8 as above described.

At the completion of the dressing operation the carriage is moved somewhat toward the right viewing Figure 2 which results in movement of the cylinder 7 while the piston 8 stands still. Thereafter the piston 8 is moved by fluid under pressure in the cylinder 7 toward the right to move the dressed end of the tool through the trimming die. Thereafter the carriage may again be moved to the right to enable the tool to be withdrawn from the tool-engaging member 10 and the dressed tool is removed from the machine by the crane.

No movable latch is provided for latching to the tool holder the end of the tool opposite the end being dressed. The tool is automatically locked to the tool-engaging member 10 by the simple movement of the tool-engaging member to the right from the position shown in Figure 4 because, as shown in Figure 5, the flange 14 of the tool is completely surrounded by the generally tubular member 17. It will be noted that even slight movement of the member 10 to the right from the position of Figure 4 locks the tool in interfitting relationship to the member 10 since the members are held against relative movement as soon as the end of the flange 14 passes beneath the bar 19. Thus only a movement of a small fraction of an inch is necessary to automatically lock the tool-engaging member of the tool holder and the tool in interfitting relationship and they remain thus locked together in all positions of the member 10 except the extreme left-hand position as demonstrated by Figure 3. The structure is foolproof, strong, rugged and inexpensive and has been found to be preferred to structures having movable latches.

While I have shown and described a present preferred embodiment of the invention it is to be distinctly understood that the invention is not limited thereto but may be otherwise variously embodied within the scope of the following claims.

I claim:

1. A tool holder for tool dressing machines comprising a support, a rigid tool-engaging member carried by the support and movable relatively thereto, means carried by the support for moving the tool-engaging member relatively to the support while the support is stationary, the tool-engaging member having a radially outwardly open socket with a reduced radially outwardly open end portion defining one wall of the socket, the socket being adapted to receive a portion of a tool of relatively great radial dimension while the end portion receives a part of the tool of relatively small radial dimension so that the tool may be introduced radially into interfitting relationship with the tool-engaging member when the tool-engaging member is in a predetermined position relatively to the support, and means fixedly carried by the support alongside the path of the tool-engaging member in its movement relatively to the support cooperating with the tool-engaging member and said portion of the tool to maintain the tool-engaging member and said portion of the tool in interfitting relationship after commencement of movement relatively to the support from said predetermined position of the tool-engaging member with said portion of the tool in interfitting relationship therewith.

2. A tool holder for tool dressing machines comprising a movable carriage forming part of the dressing machine, a rigid tool-engaging member carried by the carriage and movable relatively thereto, means carried by the carriage for moving the tool-engaging member relatively to the carriage while the carriage is stationary, the tool-engaging member being shaped to receive a portion of a tool in interfitting relationship therewith when the tool-engaging member is in a predetermined position relatively to the carriage, and means fixedly carried by the carriage alongside the path of the tool-engaging member in its movement relatively to the carriage cooperating with the tool-engaging member and said portion of the tool to maintain the tool-engaging member and said portion of the tool in interfitting relationship after commencement of movement relatively to the carriage from said predetermined position of the tool-engaging member with said portion of the tool in interfitting relationship therewith.

3. A tool holder for tool dressing machines comprising a support, a cylinder carried by the support, a piston operable in the cylinder, a rigid tool-engaging member connected with the piston for movement therewith relatively to the cylinder and support, the tool-engaging member being shaped to receive a portion of a tool in interfitting relationship therewith when the tool-engaging member is in a predetermined position relatively to the support, and means fixedly carried by the support alongside the path of the tool-engaging member in its movement relatively to the support cooperating with the tool-engaging member and said portion of the tool to maintain the tool-engaging member and said portion of the tool in interfitting relationship after commencement of movement relatively to the support from said predetermined position of the tool-engaging member with said portion of the tool in interfitting relationship therewith.

4. A tool holder for tool dressing machines comprising a movable carriage forming part of the dressing machine, a cylinder carried by the carriage, a piston operable in the cylinder, a rigid tool-engaging member connected with the piston for movement therewith relatively to the cylinder and carriage, the tool-engagement member being shaped to receive a portion of a tool in interfitting relationship therewith when the tool-engaging member is in a predetermined position relatively to the carriage, and means fixedly carried by the carriage alongside the path of the tool-engaging member in its movement relatively to the carriage cooperating with the tool-engaging member and said portion of the tool to maintain the tool-engaging member and said portion of the tool in interfitting relationship after commencement of movement relatively to the carriage from said predetermined position of the tool-engaging member with said portion of the tool in interfitting relationship therewith.

5. A tool holder for tool dressing machines comprising a support, a rigid tool-engaging member carried by the support and movable relatively thereto, means carried by the support for moving the tool-engaging member relatively to the support while the support is stationary, the tool-engaging member having a radially outwardly open recess for receiving a portion of a tool in interfitting relationship therewith when the tool engaging member is in a predetermined position relatively to the support, and means fixedly carried by the support alongside the path of the tool-engaging member and opposed to said recess in movement of the tool-engaging member relatively to the support cooperating with the tool-engaging member and said portion of the tool to maintain the tool-engaging member and said portion of the tool in interfitting relationship after commencement of movement relatively to the support from said predetermined position of the tool-engaging member with said portion of the tool in interfitting relationship therewith.

6. A tool holder for tool dressing machines comprising a support, a generally tubular member carried by the support, a rigid tool-engaging member carried by the support and movable relatively thereto and within the generally tubular member, the tool-engaging member having a radially outwardly open socket with a reduced radially outwardly open end portion defining one wall of the socket, the socket being adapted to receive a portion of a tool of relatively great radial dimension while the end portion receives a part of the tool of relatively small radial dimension so that the tool may be introduced radially into interfitting relationship with the tool-engaging member when the tool-engaging member is in position outside the generally tubular member, the generally tubular member cooperating with the tool-engaging member and said portion of the tool to maintain the tool-engaging member and said portion of the tool in interfitting relationship when the tool-engaging member and said portion of the tool enter the generally tubular member.

7. A tool holder for tool dressing machines comprising a support, a generally tubular member carried by the support, the generally tubular member being of greater length at one lateral portion thereof than at the opposite lateral portion thereof, a tool-engaging member having a radially outwardly open recess for receiving a portion of a tool in interfitting relationship therewith, the recess being disposed opposite the second mentioned lateral portion of the generally tubular member, the tool-engaging member when said recess is exposed to the outside at the second mentioned lateral portion of the generally tubular member being adapted to receive a portion of a tool in said recess, the generally tubular member cooperating with the tool-engaging member and said portion of the tool to maintain the tool-engaging member and said portion of the tool in interfitting relationship when the tool-engaging member and said portion of the tool are moved into the generally tubular member.

8. A tool holder for tool dressing machines comprising a support, a generally tubular member carried by the support, the generally tubular member being of greater length at one lateral portion thereof than at the opposite lateral portion thereof, a tool-engaging member having a radially outwardly open recess for receiving a portion of a tool in interfitting relationship therewith, the recess being disposed opposite the second mentioned lateral portion of the generally tubular member, the tool-engaging member when said recess is exposed to the outside at the second mentioned lateral portion of the generally tubular member being adapted to receive a portion of a tool in said recess, the generally tubular member having at the second mentioned lateral portion thereof and projecting generally inwardly thereof means cooperating with the tool-engaging member and said portion of the tool to maintain the tool-engaging member and said portion of the tool in interfitting relationship when the tool-engaging member and said portion of the tool are moved into the generally tubular member.

References Cited in the file of this patent

UNITED STATES PATENTS

| | | |
|---|---|---|
| 17,770 | Smith | July 7, 1857 |
| 666,509 | Furbish | Jan. 22, 1901 |
| 1,091,447 | Wagner | Mar. 24, 1914 |
| 1,418,184 | Trunick | May 30, 1922 |
| 1,505,318 | Berlow | Aug. 19, 1924 |
| 1,610,977 | Scott | Dec. 14, 1926 |
| 2,258,377 | Collins | Oct. 7, 1941 |

UNITED STATES PATENT OFFICE

CERTIFICATE OF CORRECTION

Patent No. 2,865,641                                    December 23, 1958

Walter P. McKain

It is hereby certified that error appears in the printed specification of the above numbered patent requiring correction and that the said Letters Patent should read as corrected below.

Column 2, line 72, for "drawing" read -- drawings --; column 5, line 41, for "relaively" read -- relatively --; column 6, line 11, for "tool-engagement" read -- tool-engaging --.

Signed and sealed this 2nd day of June 1959.

(SEAL)
Attest:

KARL H. AXLINE
Attesting Officer

ROBERT C. WATSON
Commissioner of Patents